Figure 2:
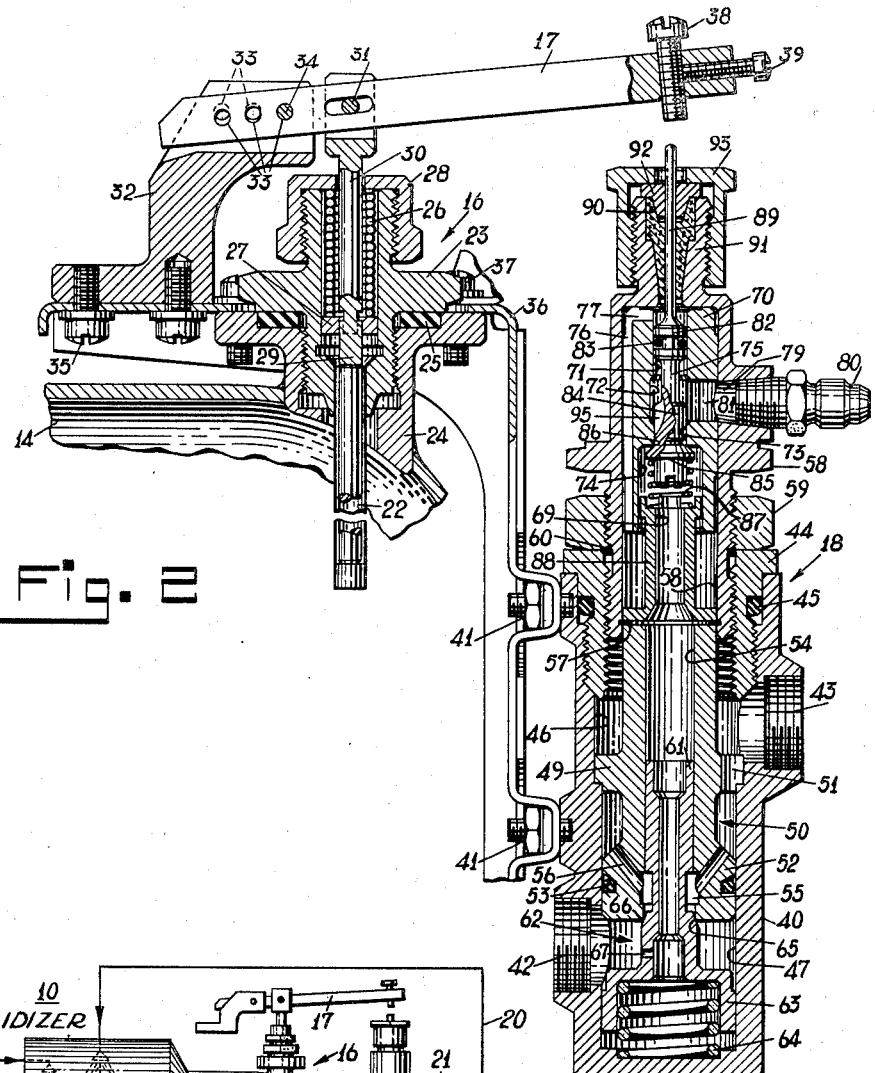

March 12, 1957  H. T. MARCY ET AL  2,784,550
SYSTEM FOR SUPPLYING MOTIVE FUEL AT CONTROLLED
TEMPERATURE TO A GAS TURBINE
Filed Jan. 5, 1951

INVENTORS.
HENRY TYLER MARCY
ROBERT J. FYFFE
BY Virgil F. Davies
ATTORNEY

United States Patent Office 2,784,550
Patented Mar. 12, 1957

2,784,550
SYSTEM FOR SUPPLYING MOTIVE FUEL AT CONTROLLED TEMPERATURE TO A GAS TURBINE

Henry Tyler Marcy, Staten Island, N. Y., and Robert J. Fyffe, Perth Amboy, N. J., assignors to The M. W. Kellogg Company, Jersey City, N. J., a corporation of Delaware Application January 5, 1951, Serial No. 204,634

1 Claim. (Cl. 60—35.6)

This invention relates in general to fluid flow control systems and in particular to a system for controlling the temperature of the gases issuing from a gas generator.

It has been proposed in connection with liquid propellant rocket motors, to drive the gas turbine of the turbopump set thereof by means of a stream of hot gases produced in a separate gas generator by the interaction of the components of the fluid propellant used by the motor. To successfully carry out this proposal it is necessary that the hot gases reach the turbine at temperatures low enough for safe turbine operation and yet high enough and constant enough for efficient and steady turbine performance.

The liquid rocket propellants used at present comprise a fuel component and an oxidizing component. The reaction between the components of the liquid rocket propellant is rapid, tends to progress rapidly to completion and liberates large quantities of energy. The interaction of these components in stoichiometric proportions results in gaseous reaction products at temperatures greatly in excess of the temperatures that can safely be withstood by the gas turbine. By changing the mixture ratio of the components in either direction from the stoichiometric ratio, the temperature of the gaseous reaction products may be reduced to values sufficiently low for safe gas turbine operation. The safe temperature range is limited as it is not possible to vary the mixture ratio too greatly from the stoichiometric ratio without entering a range in which the reaction becomes erratic and undependable. The reaction temperature-mixture ratio curve of the components is generally quite steep, hence, small variations in mixture ratio produce large temperature variations. Because of these characteristics of the components of the liquid propellants and of their reaction, the attainment of a satisfactory gas supply for the gas turbine by controlling the mixture ratio of the components supplied to the gas generator presents a problem which cannot be solved in a simple and practical manner.

It is the principal object of the invention to provide a simple, practical method and system for supplying a steady stream of hot gases within a predetermined temperature range to a gas turbine of a rocket motor by reacting the components of the liquid propellant used by the rocket motor, which does not depend on the accurate control of the mixture ratio of the components.

It is a further principal object of the invention to provide a method and system of the character mentioned for supplying a steady stream of hot gases, within a predetermined temperature range, to a gas turbine by reacting the components of the liquid rocket propellant in a gas generator chamber at a chosen mixture ratio such as to provide hot gaseous reaction products at the upper end of or above said predetermined temperature range without adjusting said chosen ratio to compensate for changes in temperature of the hot gaseous reaction products due to extraneous causes, and supplying to said chamber one or the other of said components at controlled rates to cool said gaseous products to maintain them within said predetermined temperature range.

It is also a principal object of the invention to provide a simple and compact valving arrangement for said hot gas supply system which is sensitive to small variations in temperature of the hot gases leaving the gas generator and which is capable of effecting wide and rapid variations in the rate of supply of the component used as the cooling medium in the gas generator.

Figure 1:
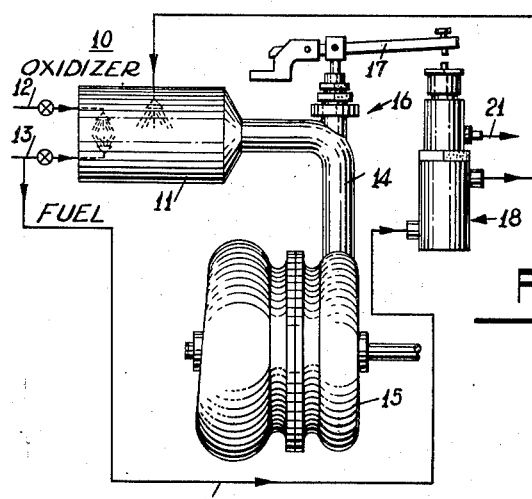

The further objects, features and advantages of the invention will be apparent from the following detailed description of the invention taken with the accompanying drawings, in which:

Fig. 1 is a diagrammatic view of the gas generating system of the invention; and Fig. 2 is a longitudinal sectional view of the control mechanism used in said system.

While the invention is of general application and may advantageously be used in various arts where temperature and flow control are of importance, it will be disclosed in connection with liquid propellant rocket motors and in particular in connection with a system for supplying hot gases to the turbine employed to drive the pumps which pressurize the components of the liquid propellant on their way to the motor chamber of the rocket.

Liquid propellants used for rocket motors include a fuel component, for example gasoline, and an oxidizer component, for example fuming nitric acid. These components react rapidly to produce highly heated gaseous products. When gasoline and fuming nitric acid are reacted in stoichiometric proportions the reaction products attain temperatures in excess of 4500° F. By varying the proportions of the components in either direction from the stoichiometric ratio the temperature of the reaction products may be rapidly and materially reduced. Small variations in the ratio of the components result in large variations in the temperature of the raction products.

While it is desirable from an efficiency standpoint to operate gas turbines at high temperatures, because of the limitations imposed by the materials out of which the turbines are constructed, it is not possible to go much above 1500° F. safely. In order to maintain turbine efficiencies within satisfactory limits, gas temperatures below 1300° F. are avoided. Also, it is highly desirable that gas temperature variations be kept to a minimum.

The novel system 10 of this invention, shown in Fig. 1, offers a simple and reliable solution to the problem. The system includes a gas generator 11 into which open the valved liquid propellant component supply lines 12 and 13. The oxidizer component is preferably supplied through the line 12 while the fuel component is preferably supplied through the line 13. The lines 12 and 13 are preferably directly connected to the main pumps, not shown, of the rocket motor. The gas generator chamber 11 includes and ignition device, not shown, such as the conventional glow plug, and an injector arrangement, also not shown, of conventional form. If the injector device includes metering orifices the valves in lines 12 and 13 may be omitted. The hot gaseous combustion products pass from the generator 11 through a conduit 14 to the inlet manifold of the gas turbine 15. Projecting into the conduit 14 is a thermostatic device 16, to be more particularly described hereinafter, which includes a pivoted lever 17 that operates the control device 18, also to be described in detail hereinafter. A line 19 connects the control device 18 to the line 13 while a line 20 connects the control device 18 to the gas generator 11. A line 21 connects the control device 18 to a sump, not shown.

In operation the valves in lines 12 and 13 are initially adjusted to give the mixture ratio that will provide a predetermined reaction temperature. This predetermined reaction temperature will be at least 1500° F., but preferably higher. For better operation and better temperature control, it has been found desirable to employ reaction temperatures greatly in excess of 1500° F., temperatures produced by reacting the components in the stoichiometric ratio or in ratios approaching the stoichiometric ratio having been employed with satisfactory results. The thermostatic device 16 and the control device 18 are set to maintain a predetermined gas temperature at the manifold 15. This predetermined operating temperature will depend on the closeness of the control that the control device 18 exercises. Thus, if device 18 permits variations as great as 100° F., a predetermined temperature of 1400° F. will be satisfactory; if the maximum variation is only 50° F. then 1450° F. can safely be chosen.

The thermostatic device 16 acts upon the control device 18 and their joint action is such that when the temperature of the gaseous reaction products passing through the conduit 14 exceeds or tends to exceed the predetermined operating temperature, the component from line 13 will pass through the lines 19 and 20 and be injected into the gas generator chamber 11 at controlled rates to reestablish said operating temperature. The injected component evaporates and gasifies in the chamber 11 and thus cools the gaseous reaction products. Since in the preferred mode of operation the reaction temperature of the components supplied through lines 12 and 13 is always chosen at or above the upper end of the safe operating range, 1500°–1300° F., there will always be injection into the chamber 11 of the component from the lines 19 and 20. The variation in rate of injection will be comparatively small, as it will only be necessitated by variations in the reaction temperature due to extraneous causes.

While it is also possible to operate the system by choosing reaction temperatures that approximate the operating temperatures, such operation does not lend itself to close control as the flow of the injected component is intermittent and there is no control if the reaction temperature should fall below the operating temperature.

Referring now to Fig. 2, wherein are shown control arrangements having the simplicity, positiveness and sensitivity necessary for the successful operation of the system just described: The thermostatic device 16 includes a tube 22 having a closed lower end and formed of a material of as high a coefficient of expansion as possible that will successfully resist exposure to the gaseous products flowing through the conduit 14. The upper end of the tube 22 is expanded against and welded to the walls of the central bore in the gland member 23 which is screw-threaded into the central bore of the lateral extension 24 of the conduit 14. A gasket 25, fitting in a recess in extension 24 is interposed between said extension and the extending flange of the gland 23 to seal the joint between them. The central bore of the gland 23 is enlarged for the major portion of its length to accommodate a coil spring 26 and a washer 27. A cap 28 screws onto the upper end of the gland 23 and abuts the upper end of the spring 26. The washer 27 has a central two diameter bore. The larger, lower portion of this bore accommodates the upper end of the rod 29. The spring 26 through the washer 27 constantly urges the rod 29 into contact with the closed end of the tube 22. The rod 29 is made of a material of minimum, or zero, coefficient of expansion. The upper end of the rod 29 is recessed and accommodates the end of the rod 30 that passes through the smaller upper portion of the central bore of the washer 27. The upper end of the rod 30 is bifurcated and mounts a pin 31 passing through a slotted hole in the lever 17 to permit pivoted movement of the rod 30 about said lever. The end of the lever 17, adjacent the pin 31, is positioned between the tines of the bifurcated support member 32. The tines of member 32 and said end of the lever 17 are each provided with a multiplicity of spaced holes 33, only three being shown, adapted to receive the pin 34 which mounts the lever 17 for pivotal movement. By moving the pin 34 from one to another set of holes 33 the ratio of movement of lever 17 and rod 30 may be varied. The support member 32 is fastened as by cap screws 35 to the bracket 36 which in turn is fastened by the cap screws 37 to the flange of the extension 24. The other end of the lever 17 carries a screw 38 passing therethrough which serves as an adjustable contact member and is locked in adjusted position by the set screw 39.

The tubular valve body 40 is attached to the lower end of the bracket 36, as by means of the studs and nuts 41, and is provided with the tapped bores 42 and 43 that receive the usual attachment nipples, not shown, for connection to the ends of the lines 19 and 20 respectively. The bottom end of the body 40 is closed while the top end is open and threaded to receive the gland 44. A seal ring 45 seals the joint between the gland 44 and the body 40. The upper portion 46 of the central bore of the body 40 is of larger diameter than the lower portion 47, a shoulder is thus provided upon which rests the flange 49 of the sleeve member 50. Spaced peripheral portions of the flange 49 are cut away, to provide a plurality of passageways 51, only one being shown, opening into the bore 46 above the flange 49 and into the bore 47 below said flange. The lower end of the sleeve 50 is in the form of a flangelike extension 52 whose outer peripheral surface contacts the walls defining the bore 47. The flange 52 includes a groove housing the seal ring 53. The central bore 54 of the sleeve 52 is enlarged adjacent its lower end to define in part the annular chamber 55. A plurality of bores 56 open into the chamber 55 and into that section of bore 47 between the flanges 49 and 52.

The upper end of the sleeve 50 contacts a snap ring 57 carried in a recess formed in the tubular cap 58 which is screwed into the gland 44. The snap ring 57 holds the sleeve 50 in position in the central bore of the body member 40. The cap 58 is locked in position by a nut 59 threaded thereon and adapted to bear on the top of the gland 44. A seal ring 60 is positioned between the cap 58, the nut 59 and the gland 44 and prevents leakage.

The stem 61 of the spool 62 extends into the lower end of the central bore 54 of the sleeve 50. Integral with the stem 61 is a hollow piston 63. A spring 64 is housed in the hollow of the piston 63 and urges said piston upwardly to seat the conical valve surface 65, formed adjacent the lower end of the stem 61 against the shoulder 66 at the lower end of the bore 54. Above said surface 65 the stem 61 is recessed to define in part the chamber 55. A metering passageway 67 is formed in the lower end of the stem 61 opening in to the central hollow of said stem and into the lower portion of the bore 47.

The tubular cap 58 has press fitted into the upper end thereof a sleeve member 70. The bore sections 71, 72, 73 and 74 make up the central bore of the sleeve 70 and house a valve stem member 75. The sleeve member 70 has a longitudinal peripheral groove 76 cut therein which intersects the radial groove 77 cut in the top surface thereof. The grooves 76 and 77 provide a passageway opening into the upper end of the bore section 71 and into the lower end of the central bore of the cap member 58. The cap member 58 includes a threaded bore 79 which receives the nipple 80 to which is connected the end of the sump line 21. The sleeve 70 at the level of the bore 79 has a portion of its wall cut away, as by a milling cutter, to provide a passageway 81 opening into the bore section 72 and into the threaded bore 79.

The valve stem member 75 includes an enlarged piston portion 82 having a peripheral groove in which fits the seal ring 83. At the lower end of the valve stem member 75 is a second enlarged piston portion made up of the sections 84 and 85. Between the sections 84 and 85 is a groove 86. The lower end of the piston section 85 retains the spring 87 whose bottom end rests on the castellated upper end of the sleeve 88. The spring 87 urges the valve stem 75 upwardly to seat the section 85 on the shoulder at the junction of the bore sections 74 and 73. The lower end of the sleeve 88 is flanged to fit loosely in the lower end of the central bore of the cap member 58 and rest on the snap ring 57. The valve stem 75 includes a rod member 89 which extends from the upper end of the piston enlargement 82 and is adapted to be contacted by screw 38. The rod 89 is encircled for a substantial portion of its length by the deformable bushing seal 90 which is pressed into an appropriately shaped recess in the threaded extension 91 of the cap 58 by a metal retainer 92. The retainer is moved downwardly by a cap 93 threaded on the extension 91.

The piston enlargement 82 and the piston enlargement section 84 are of such diameter that while leakage past them is a minimum, they may be moved along the respective bore sections 71 and 73 with a minimum of resistance. Also the areas of piston sections 82 and 85 are such and are so disposed that the force produced by the pressure of the fuel component thereon tending to move the valve stem 75 upwardly is substantially balanced by the force produced by the pressure of the fuel component on the surface of the upper end of the piston enlargement 82 tending to move the valve stem 75 downwardly. Thus, the lever 17 need overcome essentially only the force exerted by the spring 87 and the frictional resistances of seals 83 and 90 in moving the valve stem 75 downwardly, and as the lever 17 moves upwardly, the spring 87 need only overcome the weight of the valve stem 75 and the frictional resistances of the seals 83 and 90 to raise said valve stem with the lever 17.

In order that the device 18 be sensitive to small temperature differences and provide for rapid adjustments due to large temperature differences, it is necessary that the valve stem 75 in the initial phases of its downward movement from the position of Fig. 2 permit only small flow from the bore section 74 to bore section 72 and that in later phases of said downward movement permit much greater flow. To this end, the valve stem 75 has an arcuate groove 95 cut therein. The groove 95 has a V-shaped cross-section and is preferably cut by a milling cutter. The bottom end of the groove 95 is slightly above the groove 86 and is separated therefrom by a narrow ledge. The depth of the groove 95 increases from its lower end in a non-linear manner for a distance substantially equal to the maximum downward movement of the valve stem member 75.

Assuming that the screw 38 has been locked in adjusted position such that the lower end of the groove 95 will be moved past the shoulder between the bore sections 72 and 74 the amount required to maintain the temperature of the hot gases in the conduit 14 at 1400° F., the lines 12 and 13 are at full pump pressure, 600–800 p. s. i., that ignition has been started but that the gaseous reaction products in the conduit 14 have not attained temperatures approaching the safe operating range, 1300–1500° F., and that the components are supplied in such proportion that the gaseous reaction products attain a temperature of the order of 2500° F. The elements of the devices 16 and 18 will be positioned as in Fig. 2. The static pressure around the spool 62 will be the same as the static pressure within the spool 62 so that the valve surface 65 will be maintained in contact with the shoulder 66 through the pressure exerted by the spring 63 since the spool 62 is constructed to be completely pressure-balanced under these conditions. The same static pressure will also attain in bore section 74 and at the top of the bore section 71 so that the section 85 of the valve stem 75 will also be held against its seat solely through the pressure of the spring 87.

As the temperature in the conduit increases the tube 22 will lengthen and spring 26 will move rod 29 downwardly. The rod 30 will follow the rod 29 to rotate lever 17 about the pin 34 and ultimately the screw 38 will move the valve stem 75 downwardly to carry the lower end of the groove 95 past the shoulder between the bore sections 72 and 74. When this occurs the component from the line 19 will flow from the bore section 74 into the bore section 72 and hence through line 21 to the sump. This flow will cause a flow of the same value through the passageway 67 and through the hollow of the spool 62 with the result that the static pressure within the spool will be reduced. As the expansion of tube 22 continues, the static pressure difference between the outside and the inside of the spool will ultimately be enough to overcome the force exerted by the spring 64 and the spool will move downwardly to unseat the surface 65 and flow will take place into chamber 55 and thence through bore 46 and the line 20 into the gas generator chamber 11 wherein the injected component will be evaporated and gasified and thus cool the gaseous reaction products. The downward movement of the valve stem 75 and the resultant increase in flow through line 20 will continue until the temperature of the gases in the conduit 14 reaches the predetermined temperature of 1400° F. If the reaction conditions do not change there will be no further change in the rate of flow into the line 20. However, if for any reason the reaction conditions change and the temperature of the gases in conduit 14 tends to increase, the further expansion of the tube 22 will result in a further increase in the rate of flow into the line 20. If, however, the change in reaction conditions tends to reduce the temperature of the gases in conduit 14, the tube 22 will contract and the following movement of the rod 29 will raise the lever 17. The spring 87 will move the valve stem 89 to follow the contact 38 and the flow through the groove 95 will be diminished. The reduction in flow will increase the static pressure within the spool 62 so that the spring 63 will move the spool 62 upwards to reduce the flow into the chamber 55 thus reducing the rate of flow through the line 20.

What is claimed is:

In a gas turbine plant of the character employed in a liquid, two-component propellant rocket motor, the combination comprising, a gas turbine, a gas generator chamber having an inlet end and an outlet end, conduit means connecting the outlet end of said chamber to said turbine, means at the inlet end of said chamber separately supplying each of the two components of a two-component rocket motor liquid propellant into said chamber for interaction therein in substantially fixed proportions, a line opening into said chamber intermediate the ends thereof supplying one of said components into said chamber to cool the gaseous products of said interaction, valve means in said line including a spring-pressed control member normally held in flow shut-off position and movable through a range of flow-on positions, and a thermostatic device projecting into said conduit and including an element movable in accordance with the temperature in said conduit and adapted to engage said control member to move it from said flow shut-off position through said range of flow-on positions, said element including means settable to establish the temperature in said conduit at which said control member is moved into said range of flow-on positions.

(References on following page)

References Cited in the file of this patent

UNITED STATES PATENTS

| | | | |
|---|---|---|---|
| 1,314,175 | Wells | Aug. 26, | 1919 |
| 2,011,420 | Samuelson | Aug. 13, | 1935 |
| 2,016,921 | Goddard | Oct. 8, | 1935 |
| 2,131,781 | Lysholm | Oct. 4, | 1938 |
| 2,217,649 | Goddard | Oct. 8, | 1940 |
| 2,217,876 | Richardson | Oct. 15, | 1940 |
| 2,404,428 | Bradbury | July 23, | 1946 |
| 2,465,525 | Goddard | Mar. 29, | 1949 |
| 2,495,785 | Stephens | Jan. 31, | 1950 |
| 2,516,782 | Magrum | July 25, | 1950 |
| 2,531,761 | Zucrow | Nov. 28, | 1950 |
| 2,568,127 | May et al. | Sept. 18, | 1951 |
| 2,611,239 | Briggs | Sept. 23, | 1952 |